(12) United States Patent
Lew

(10) Patent No.: US 8,372,770 B2
(45) Date of Patent: Feb. 12, 2013

(54) REFORMER REGENERATION PROCESS

(75) Inventor: Lawrence E. Lew, Napa, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 249 days.

(21) Appl. No.: 12/635,430

(22) Filed: Dec. 10, 2009

(65) Prior Publication Data

US 2010/0152021 A1 Jun. 17, 2010

Related U.S. Application Data

(60) Provisional application No. 61/121,642, filed on Dec. 11, 2008.

(51) Int. Cl.
*B01J 38/12* (2006.01)
*B01J 20/34* (2006.01)
*B01J 38/30* (2006.01)
*B01J 38/34* (2006.01)
*B01J 38/14* (2006.01)

(52) U.S. Cl. ........... 502/38; 502/20; 502/41; 502/43; 502/52

(58) Field of Classification Search ............ 502/20, 502/34–49, 51, 53
See application file for complete search history.

(56) References Cited

U.S. PATENT DOCUMENTS

| | | | |
|---|---|---|---|
| 2,368,507 A | 1/1945 | Welty | |
| 2,853,435 A * | 9/1958 | Evering et al. | 208/139 |
| 3,230,179 A | 1/1966 | Schwarzenbek | |
| 3,248,338 A | 4/1966 | Decker | |
| 3,986,982 A | 10/1976 | Crowson et al. | |
| 4,251,392 A | 2/1981 | Mauldin et al. | |
| 4,595,703 A | 6/1986 | Payne et al. | |
| 5,155,075 A | 10/1992 | Innes et al. | |
| 5,453,558 A | 9/1995 | Alexander et al. | |
| 5,846,294 A * | 12/1998 | Doong | 95/98 |
| 5,866,495 A | 2/1999 | Fung et al. | |
| 6,472,340 B2 | 10/2002 | Lin | |
| 2007/0142486 A1 | 6/2007 | Limerkens et al. | |
| 2010/0152021 A1 * | 6/2010 | Lew | 502/49 |

* cited by examiner

*Primary Examiner* — Kaj K Olsen
*Assistant Examiner* — Jennifer Smith
(74) *Attorney, Agent, or Firm* — Nirav Patel; E. Joseph Gess; Michael D. Ross

(57) ABSTRACT

This invention is directed to a process for regenerating a deactivated reforming catalyst by circulating a first oxygen-containing gas stream from a gas compressor to a catalyst bed in a reforming reaction zone in order to remove at least a portion of the carbonaceous deposits on the reforming catalyst. Then, a second oxygen-containing gas stream is further circulated from the gas compressor to the reforming catalyst bed, for oxidizing the reforming catalyst, and an inert gas stream is passed from the gas compressor through the reforming catalyst bed to purge a substantial portion of the oxygen contained therein for a time sufficient to reduce the oxygen content of an exiting purge gas stream to less than about 2% by volume oxygen.

5 Claims, No Drawings

REFORMER REGENERATION PROCESS

This application claims the benefit of U.S. Provisional Application No. 61/121,642, filed Dec. 11, 2008.

FIELD OF THE INVENTION

The present invention relates to an improved process for regenerating a reforming catalyst.

BACKGROUND OF THE INVENTION

Catalytic reforming of naphtha feedstocks is well known in the petroleum refining industry. Most naphtha feeds contain large quantities of naphthenes and paraffins and consequently they have low octane numbers. In catalytic reforming, these components go through a variety of hydrocarbon conversions resulting in a gasoline product of improved octane number. Some of the more important conversion reactions include dehydrogenation of naphthenes to aromatics and dehydrocyclization of normal paraffins to aromatics. Less desirable reactions which commonly occur include hydrocracking of paraffins and naphthenes to produce gaseous hydrocarbons such as methane and ethane. Due to these less desirable reactions, an important objective of catalytic reforming is to rearrange the structure of the hydrocarbon molecules to form higher octane products without any significant change in the carbon number distribution of the stock.

The reforming reactions are typically catalyzed by reforming catalysts comprising porous supports, such as alumina, that have dehydrogenation promoting metal components impregnated or mixed therewith. In a conventional reforming process, a series of reactors constitute the basis of the reforming unit. Each reforming reactor is generally provided with a fixed bed or beds of the catalyst which receive upflow or downflow feed. Each reactor is provided with a heater because the reactions which take place therein are endothermic. In a conventional reforming process, a naphtha feed with hydrogen or hydrogen recycle gas is passed through a preheat furnace, then through a reactor, and then in sequence through subsequent interstage heaters and reactors of the series. The product of the last reactor is separated into a liquid fraction and a vaporous effluent. The vaporous effluent, a gas rich in hydrogen, is used as hydrogen recycle gas in the reforming process.

During operation, the activity of the reforming catalyst gradually declines due to the build-up of coke, and the temperature of the process is gradually raised to compensate for the activity loss caused by the coke deposits. Eventually, economics dictate the necessity of regenerating the catalyst. Furthermore, the presence of halogens such as chlorine during regeneration results in the formation of corrosive by-products such as HCl and $NH_4Cl$. These compounds can cause damage to equipment used in the reforming process such as heat exchangers, liquid/gas separators and reactor internals. The halogen containing compounds and their products necessary for platinum redispersion are highly toxic as well.

Current regeneration methods of a reforming catalyst take several days, and the equipment is exposed to hydrochloric acid during this period. In conventional processes, the oxygen which remains in the catalyst bed after regeneration is purged from the catalyst at low pressure, typically less than 50 psig, and at temperatures around 400° F. The hydrogen which is then introduced to reduce the catalyst is brought in at this low temperature. The required additional cooling to bring the catalyst to around 400° F., and the additional heating to return the catalyst to reaction temperature adds many hours for the regeneration. Thus, there is a need for catalytic reforming processes wherein the catalyst regeneration process is conducted at effectively moderate reaction temperatures and pressures, using gas compressors, pumps and valves which are employed during the reforming process, which results in substantial operating economies as compared with processes and systems of the prior art.

SUMMARY OF THE INVENTION

This invention is directed to a process for regenerating a deactivated reforming catalyst. The process comprises circulating a first oxygen-containing gas stream from a gas compressor to a catalyst bed in a reforming reaction zone at a pressure in the range of about 50 psig to about 400 psig and at a temperature in the range of about 700° to about 1000° F., in order to remove at least a portion of the carbonaceous deposits on the reforming catalyst. Then, a second oxygen-containing gas stream is further circulated from the gas compressor to the reforming catalyst bed, for oxidizing the reforming catalyst, and an inert gas stream is passed from the gas compressor, at a pressure in the range of about 5 psig to about 300 psig and at a temperature in the range of about 700° to about 1000° F., through the reforming catalyst bed to purge a substantial portion of the oxygen contained therein for a time sufficient to reduce the oxygen content of an exiting purge gas stream to less than about 2% by volume oxygen. The inert gas stream is typically nitrogen. The reforming catalyst bed is then pressured with hydrogen gas at a rate sufficient to maintain a pressure in the range of about 100 psig to about 325 psig and at a temperature of above about 700° F.

DETAILED DESCRIPTION OF THE INVENTION

This invention relates to an improved process for reforming a hydrocarbon feedstock of the naphtha boiling range, and in particular, a semi-continuous process utilizing a fixed bed, or preferably a plurality of fixed beds, of catalyst with intermittent regeneration and rejuvenation of the catalyst. By the term "reforming" we mean the process of converting paraffins, naphthenes or olefins to aromatic hydrocarbons via hydrodecyclization or dehydrogenation. Feedstocks useful in reforming typically include hydrocarbons having from six to eleven carbon atoms, but these feeds can also include narrower cuts, such as a $C_6$ to $C_7$ cut. Indeed, the reforming catalysts that can be regenerated by the process of this invention can be used to make chemicals as well as gasoline components. For example, benzene, toluene or mixtures thereof can be produced by reforming hydrocarbons having six to seven carbon atoms. Each reforming reactor is generally provided with a fixed bed or beds of the catalyst which receive radial flow feed.

The present invention deals especially with a catalytic reforming process wherein catalyst regeneration is effectively conducted at reaction temperatures and pressures, using the gas compressors, pumps and valves which are employed during the reforming process. Hence, the present invention obviously results in substantial operating economies as compared with processes and systems of the prior art, especially where noble metal catalysts such as platinum or palladium are employed. The present invention involves a catalyst regeneration procedure that reduces the downtime for the reactor when compared to conventional operations, as the processes of this invention utilize a different transition temperature between rejuvenation and reduction somewhat higher than conventional operations. This is coupled with an occasional shutdown or partial shutdown for reactivation or regeneration of catalyst, so that the process may be regarded as a semi-continuous or semi-regenerative reforming process. This is accomplished by interrupting feed and using part of the normal operating equipment, during such interruption, to both regenerate and rejuvenate the catalyst.

Generally, the reforming process of this invention typically operates at a temperature in the range of about 600° to about 1050° F. and at a pressure up to about 400 psig, to convert normal and branched paraffins to high octane branched and aromatic hydrocarbons, mainly in the $C_5$ to $C_9$ range. The catalyst is periodically reactivated in the reactor vessel by a series of steps, including regeneration, rejuvenation and reduction. During regeneration, an oxygen-containing gas is supplied to the catalyst to burn off the deposited carbon. During rejuvenation, the oxygen content of the gas is increased somewhat, and used to oxidize the catalyst, disperse the platinum, and restoring its activity. During reduction, hydrogen is supplied to remove the oxygen from the catalyst and restore the metal function of the catalyst. Suitable heating means are provided between the reactors to compensate for the net endothermic heat of reaction in each of the reactors.

The catalysts regenerated and rejuvenated in this invention generally comprise platinum on an alumina support. In addition to platinum, the catalysts regenerated and rejuvenated by the present invention may contain elements such as rhenium, tin, germanium, iridium, copper, iron, cobalt, nickel, and titanium which in certain cases may improve catalyst selectivity or stability.

In carrying out the process of this invention, the hydrocarbon feedstock and a hydrogen rich gas arising from a vapor/liquid separator and through a compressor are preheated and charged to a series of at least two reactors for reforming the hydrocarbon feedstock (reforming reaction zones). Preferably, there are three or four reactors, which contain various catalyst compositions in each of the reactors. The reactors containing the various catalyst compositions are typically separate, although it is possible that the reforming zones could have separate catalyst beds in a single reactor. The number of reactors may be greater or less depending on octane number, plant capacity, feed quality, etc. This process typically occurs between about 600° F. and about 1050° F. degrees, and preferably at about 950° F. The catalyst is periodically reactivated in the reactor vessel by a series of steps, including regeneration, rejuvenation and reduction.

The regeneration of catalysts of all types is known in a broad sense. According to this invention, the naphtha feed is interrupted at suitable intervals, e.g. 2 to 24 months and replaced by controlled feed of inert gas using much of the same equipment, followed by treatment with diluted oxygen for regeneration and this, in turn, is followed by treatment with a gas richer in oxygen, for rejuvenation. Treating conditions will be explained in greater detail below.

The gradual accumulation of coke and other deactivating carbonaceous deposits on the catalyst will eventually reduce the activity of the catalyst and selectivity of the reforming process. Typically, catalyst regeneration becomes desirable when from about 1.0 to about 50.0 wt %, and preferably about 3.0 to about 25.0 wt. % or more of carbonaceous deposits are laid down upon the catalyst. At this point, it is typically necessary to take the hydrocarbon feedstock out of contact with the catalyst and purge the hydrocarbon conversion zone with a suitable inert gas stream. The catalyst regeneration is then performed either by unloading the catalyst from the conversion zone and regenerating in a separate vessel or facility or performing regeneration in-situ. Alternatively, the catalyst may be continuously withdrawn from the reactor for regeneration in a separate vessel, and subsequently returned to the reactor.

In fixed bed operations, it may sometimes be necessary to dump the catalyst from the reactors and screen out fines in order to reduce pressure drop. This typically occurs after a few years of operation. The dump and screen procedure is usually done in combination with a catalyst regeneration. First carbon is burned off the catalyst prior to the procedures of this invention. This also serves to reoxidize finely divided metals on the catalyst such as iron and platinum. In their metallic form, these metals will rapidly oxidize when exposed to air and possibly ignite a fire or explosion when hydrocarbons are also present.

The catalyst may then be dumped from the reactors into a screening device where the fines are removed. It may be then reloaded into the reactors and then rejuvenated, purged with nitrogen, after which hydrogen is introduced, then heated to reduction temperature. The catalyst may then reduced as will be discussed shortly and returned to reforming service.

An essential step of the regeneration incorporates a carbon burn step. The carbon burn step involves contacting the deactivated catalyst with a gaseous mixture of a circulated first oxygen containing gas stream and an inert gas stream. Typical inert gases useful in the carbon burn step may include nitrogen, carbon dioxide, and like gases or any mixture thereof; nitrogen being preferred. The oxygen is typically derived from air and supplied from a compressor, and the inert gas serves as a diluent, such that oxygen concentration is from about 0.1% to about 3.0% volume oxygen. The practice of the present invention is not limited to use of air, however, and higher levels of oxygen may be used in methods where oxygen is supplied in a more pure form such as from cylinders or other containing means. The regeneration gases should be substantially sulfur-free as they enter the reactor. Because the oxygen content determines the rate of burn, it is desirable to keep the oxygen content low so as not to damage the catalyst by overheating and causing catalyst support damage, while still conducting the carbon burn step in a manner that is both quick and effective.

The carbon burn process of the present regeneration method occurs at a temperature of between about 600° F. to about 1050° F. Preferably, the reactor inlet temperatures are at about 725° F., and the reactor outlet temperatures are at about 850° F. To avoid catalyst damage, the maximum difference between the inlet and outlet temperatures is limited to about 125° F. Other conditions present during the carbon burn step include a pressure sufficient to maintain the flow of the gaseous oxygen containing mixture through the catalyst zone such as a pressure of between about 50 psig to about 400 psig.

The regeneration method of the present invention is performed in HCl environment. By HCl environment, we mean that chlorine, or their compounds including for example, hydrogen chloride, carbon tetrachloride, ethylene dichloride, propylene dichloride or perchloroethylene; are added during the catalyst regeneration process.

During the regeneration and rejuvenation processes, a neutralization solution containing water, caustic and/or soda ash is used to neutralize HCl generated from the chlorine compounds above.

The carbon burn step results in removing most of the carbonaceous material from the catalyst while leaving an amount of from between about 0.01 to about 0.5 wt. % carbon on the catalyst.

The resulting regenerated catalyst with a portion of carbonaceous material burned off is thereafter typically cooled to about 850° F. and purged with nitrogen or another inert gas to displace most of oxygen and water therefrom. After regeneration, the reactors are rejuvenated in series, or in parallel. Since rejuvenation is carried out at up to about 1000° F., and preferably about 950° F., the reactors, must be heated following regeneration. This is accomplished by circulating flue gas containing a low percentage of oxygen through a preheat furnace and then to the reactors. This procedure protects the catalyst against overheating if unburned pockets of carbon exist, e.g. in one of the subsequent reactors. Then, a second oxygen containing gas stream containing from about 20-100% volume oxygen, such as air, and is added to the circulating flue gas to create a stream which preferably contains about 3 to about 10% of oxygen by volume, more preferably about 5 to about 7% of oxygen by volume, is introduced into each reactor. Rejuvenation is continued for about 6-36 hours. After rejuvenation the system is cooled down by circulating a mixture of air and inert gas through the entire system. The rejuvenation pressure is between about 50 and about 400 psig, preferably above 100 psig. At the end of rejuvenation, the circulation of neutralization solution is stopped and the solution is drained and washed from the system The invention takes the catalyst temperature after rejuvenation from about 950° F. to a temperature in the range of about 700° F. to about 1000° F., and preferably initially down to about 850° F. at about 50 degrees ° F. per hour. All the while the compressor is still running, oxygen is purged from the system, with an inert gas such as nitrogen. The pressure at this step is reduced to between about 5 psig to about 200 psig, and preferably down to about 70 psig, and the duration of this step takes up to about 3 hours. In this step, the oxygen content is retained to be above about 0.5 volume percent to ensure that the catalyst stays oxidized prior to reduction. Once the oxygen content is below about 2 volume percent, and preferably below about 1 volume percent, hydrogen is introduced and circulated via a compressor. The hydrogen quickly consumes the oxygen, and then the pressure of the unit is raised to between about 100 psig to about 300 psig, and preferably up to about 170 psig by the introduction of additional hydrogen, all while the compressor is running. Once the unit is fully pressured by use of the hydrogen, the temperature is raised from about 850 to about 950 deg ° F. at about 50 deg ° F. per hour. The duration of these steps takes up to about 2 to 5 hours. Since the temperature doesn't drop below about 850 deg ° F., very little water, which is associated with the end of the oxidation, is picked up by the catalyst, thus speeding dryout once hydrocarbon feed is introduced after the reduction portion of the procedure. Also, because the temperature doesn't need to be reduced to about 400° F., then raised back up to about 950° F. at about 50° F. per hour, many operating hours are saved. Due to the speed of this procedure change, the steel in the reforming unit is left unprotected from HCl for a much shorter time. As mentioned earlier, less water is picked up by the catalyst because the temperature is kept high, the dryout phase, once hydrocarbons are reintroduced, is much shorter (up to 1 day shorter). Since the compressor is kept running, there are fewer complications due to shutdown and restart of the mechanical equipment.

After completing the reduction step, the temperature is lowered to about 700° F. or less. The reforming process in which the catalyst is employed may be resumed by charging the hydrocarbon feedstock to the catalyst zone and adjusting the reaction conditions to achieve the desired conversion and product yields.

In the present process, all of these steps are conducted at temperatures of greater than about 700° F.; furthermore, all of the gaseous reactants used in the process are supplied to the process using the feed compressor.

In conventional processes, the oxygen which remains in the catalyst bed after regeneration and rejuvenation are purged from the catalyst at atmospheric pressure and at temperatures below about 400° F. At this point, the compressor is shut down, and hydrogen is then introduced at this low temperature to reduce the catalyst. The required additional cooling to bring the catalyst to less than about 400° F., and the additional heating to return the catalyst to reaction temperature plus the time to shut down and start up the compressor adds many hours to the regeneration process, when compared with the process of this invention.

What is claimed is:

1. A process for regenerating in-situ a deactivated reforming catalyst, comprising the steps of:
    (a) circulating a first oxygen-containing gas stream from a gas compressor to a catalyst bed in a reforming reaction zone at a pressure in the range of about 50 psig to about 400 psig and at a temperature in the range of about 600° to about 1050° F., to remove at least a portion of the carbonaceous deposits on the reforming catalyst;
    (b) further circulating a second oxygen-containing gas stream from the gas compressor to the reforming catalyst bed, for oxidizing the reforming catalyst;
    (c) passing an inert gas stream from the gas compressor at a pressure in the range of about 5 psig to 300 psig and at a temperature in the range of about 600° to about 1050° F. through the reforming catalyst bed to purge a substantial portion of the oxygen contained therein for a time sufficient to reduce the oxygen content of an exiting purge gas stream to less than about 2% by volume, but above about 0.5 volume percent oxygen, and wherein the inert gas stream is nitrogen; and
    (d) pressuring the reforming catalyst bed with hydrogen gas at a rate sufficient to maintain a pressure in the range of about 100 psig to about 325 psig and at a temperature of above about 700° F.;
    with the compressor running continuously during the process.

2. The process of claim 1 wherein the oxygen content of the first oxygen containing gas stream is between about 0.1% to about 3% by volume oxygen.

3. The process of claim 1 wherein the oxygen content of the second oxygen containing gas stream is between about 3% to about 10% by volume oxygen.

4. The process of claim 1 wherein the reforming catalyst comprises a platinum on alumina reforming catalyst.

5. The process of claim 4 wherein the reforming catalyst may optionally contain at least one metal selected from the group consisting of rhenium, iridium, germanium, tin, copper, iron, cobalt, nickel, palladium, and titanium, individually or in combinations thereof.

* * * * *